(12) United States Patent
Ito

(10) Patent No.: US 11,748,482 B2
(45) Date of Patent: Sep. 5, 2023

(54) INFORMATION PROCESSING APPARATUS, AND INFORMATION PROCESSING METHOD

(71) Applicant: CANON KABUSHIKI KAISHA, Tokyo (JP)

(72) Inventor: Yoshiharu Ito, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 1070 days.

(21) Appl. No.: 16/360,510

(22) Filed: Mar. 21, 2019

(65) Prior Publication Data

US 2019/0303580 A1    Oct. 3, 2019

(30) Foreign Application Priority Data

Mar. 27, 2018  (JP) ................................ 2018-060737

(51) Int. Cl.
*G06F 21/57* (2013.01)
*G06F 9/54* (2006.01)
(Continued)

(52) U.S. Cl.
CPC .......... *G06F 21/572* (2013.01); *G06F 9/4401* (2013.01); *G06F 9/545* (2013.01);
(Continued)

(58) Field of Classification Search
CPC ........ G06F 21/44; G06F 21/445; G06F 21/51; G06F 21/57; G06F 21/572; G06F 21/575; G06F 21/79; G06F 9/4401; G06F 9/441; G06F 9/54; G06F 9/545; G06F 9/4416; H04L 9/3247

See application file for complete search history.

(56) References Cited

U.S. PATENT DOCUMENTS 5,852,720 A * 12/1998 Gready ............... G06F 11/0766
714/E11.2
5,857,074 A * 1/1999 Johnson ............. G06F 11/0709
714/E11.193
(Continued)

FOREIGN PATENT DOCUMENTS

CN    102708044 A  * 10/2012  .......... G06F 11/1004
CN    106934289 A  *  7/2017
(Continued)

OTHER PUBLICATIONS

Rosenbaum, "A tour beyond bios into UEFI secure boot", Intel Corporation, Jul. 2012 (Year: 2012).*

(Continued)

*Primary Examiner* — Luu T Pham
*Assistant Examiner* — Paul J Skwierawski
(74) *Attorney, Agent, or Firm* — Venable LLP

(57) ABSTRACT

An information processing apparatus that successively activates a plurality of modules, comprises a first module, a second module, and a third module. The first module activates the second module which has been verified, and the second module activates the third module which has been verified. The first module includes verification information used for verifying both of the second module and the third module, verifies the second module using the verification information and verifies the third module using the verification information.

11 Claims, 10 Drawing Sheets

(51) Int. Cl.
   *G06F 21/44*   (2013.01)
   *G06F 9/4401*   (2018.01)
   *H04L 9/32*   (2006.01)

(52) U.S. Cl.
   CPC .......... *G06F 21/445* (2013.01); *G06F 21/575* (2013.01); *H04L 9/3247* (2013.01); *G06F 9/441* (2013.01)

(56) References Cited

U.S. PATENT DOCUMENTS

| | | | | |
|---|---|---|---|---|
| 6,233,634 | B1* | 5/2001 | Clark | G06F 11/0709 |
| | | | | 711/146 |
| 7,962,738 | B2* | 6/2011 | Zimmer | G06F 21/51 |
| | | | | 713/2 |
| 9,141,802 | B2* | 9/2015 | Yao | G06F 21/79 |
| 9,323,541 | B2* | 4/2016 | Long | G06F 21/51 |
| 11,055,413 | B2* | 7/2021 | Shimizu | H04L 9/3247 |
| 2009/0240954 | A1* | 9/2009 | Figueroa | H04W 12/12 |
| | | | | 713/193 |
| 2012/0246615 | A1* | 9/2012 | Persson | G06F 9/4411 |
| | | | | 717/120 |
| 2013/0339939 | A1* | 12/2013 | Ishikawa | G06F 8/65 |
| | | | | 717/168 |
| 2014/0025941 | A1* | 1/2014 | Bulusu | G06F 21/561 |
| | | | | 713/2 |
| 2014/0040636 | A1* | 2/2014 | Jeansonne | G06F 21/575 |
| | | | | 713/189 |
| 2014/0089651 | A1* | 3/2014 | Yao | H04L 9/3247 |
| | | | | 713/2 |
| 2014/0115314 | A1* | 4/2014 | Huang | G06F 9/4401 |
| | | | | 713/2 |
| 2014/0258700 | A1* | 9/2014 | England | G06F 21/572 |
| | | | | 713/2 |
| 2015/0134977 | A1* | 5/2015 | Henry | G06F 21/572 |
| | | | | 713/194 |
| 2016/0087801 | A1* | 3/2016 | Jones | G06F 21/575 |
| | | | | 713/176 |
| 2016/0274918 | A1* | 9/2016 | Moon | G06F 21/575 |
| 2017/0372073 | A1* | 12/2017 | Gunti | G06F 21/575 |
| 2017/0372074 | A1* | 12/2017 | Gunti | G06F 21/575 |
| 2018/0032734 | A1* | 2/2018 | Gunti | G06F 21/575 |
| 2018/0341774 | A1* | 11/2018 | Yao | G06F 21/44 |
| 2019/0114429 | A1* | 4/2019 | Shimizu | H04L 9/3247 |
| 2021/0312057 | A1* | 10/2021 | Kloth | G06F 21/57 |
| 2021/0373909 | A1* | 12/2021 | Zimmermann | G06F 21/83 |

FOREIGN PATENT DOCUMENTS

| | | | | |
|---|---|---|---|---|
| CN | 106934289 A | | 7/2017 | |
| JP | 2005148934 A | * | 6/2005 | |
| JP | 2005148934 A | | 6/2005 | |
| JP | 2015022521 A | * | 2/2015 | |
| JP | 2021140601 A | * | 9/2021 | |
| WO | 2015/119750 A1 | | 8/2015 | |
| WO | WO-2015119750 A1 | * | 8/2015 | G06F 21/10 |
| WO | WO-2021127174 A1 | * | 6/2021 | |

OTHER PUBLICATIONS

European Office Action dated Oct. 19, 2021 in corresponding European Patent Appln. No. 19163734.7.

Jun. 4, 2019 European Search Report in European Patent Appln. No. 19163734.7.

* cited by examiner

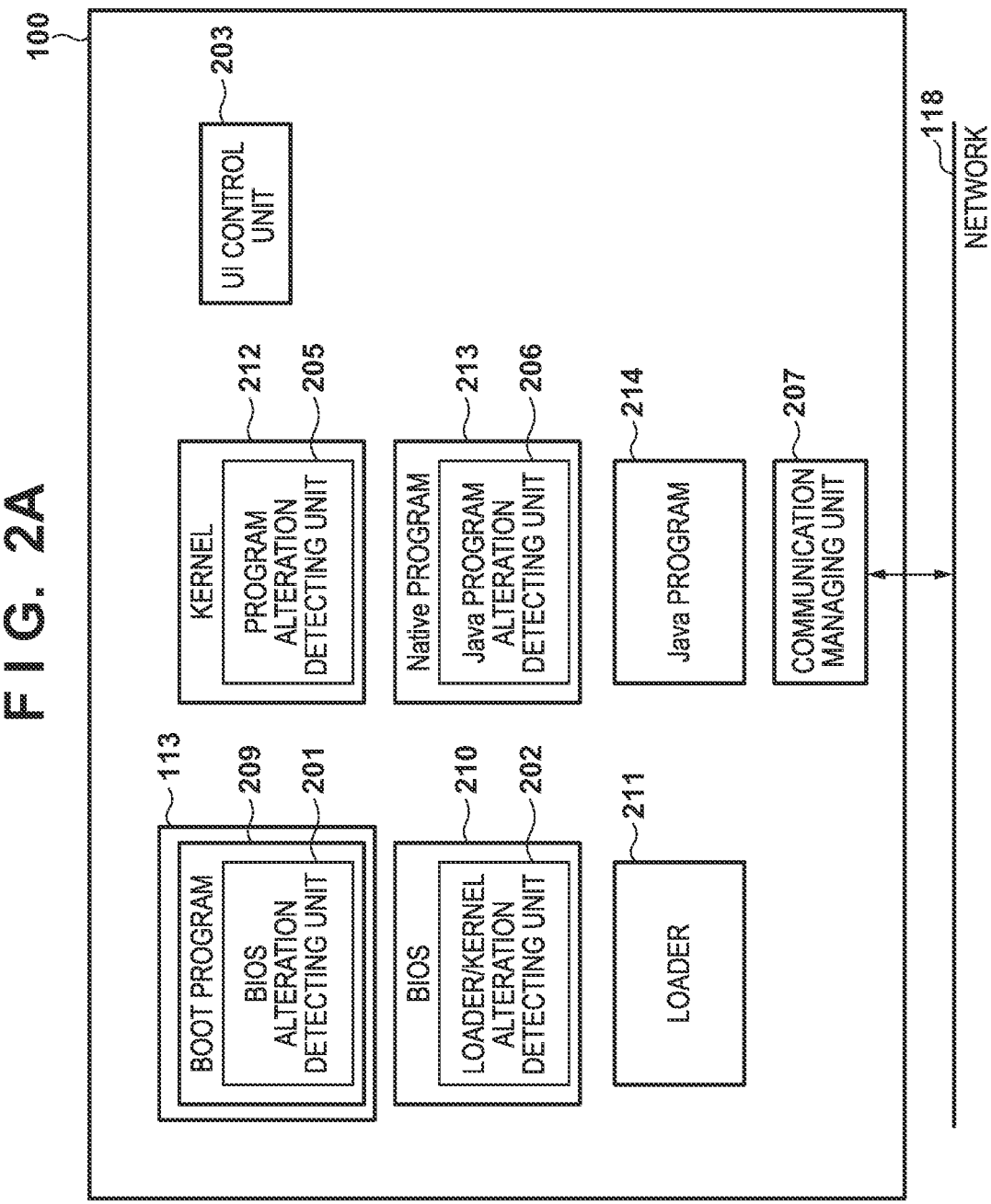

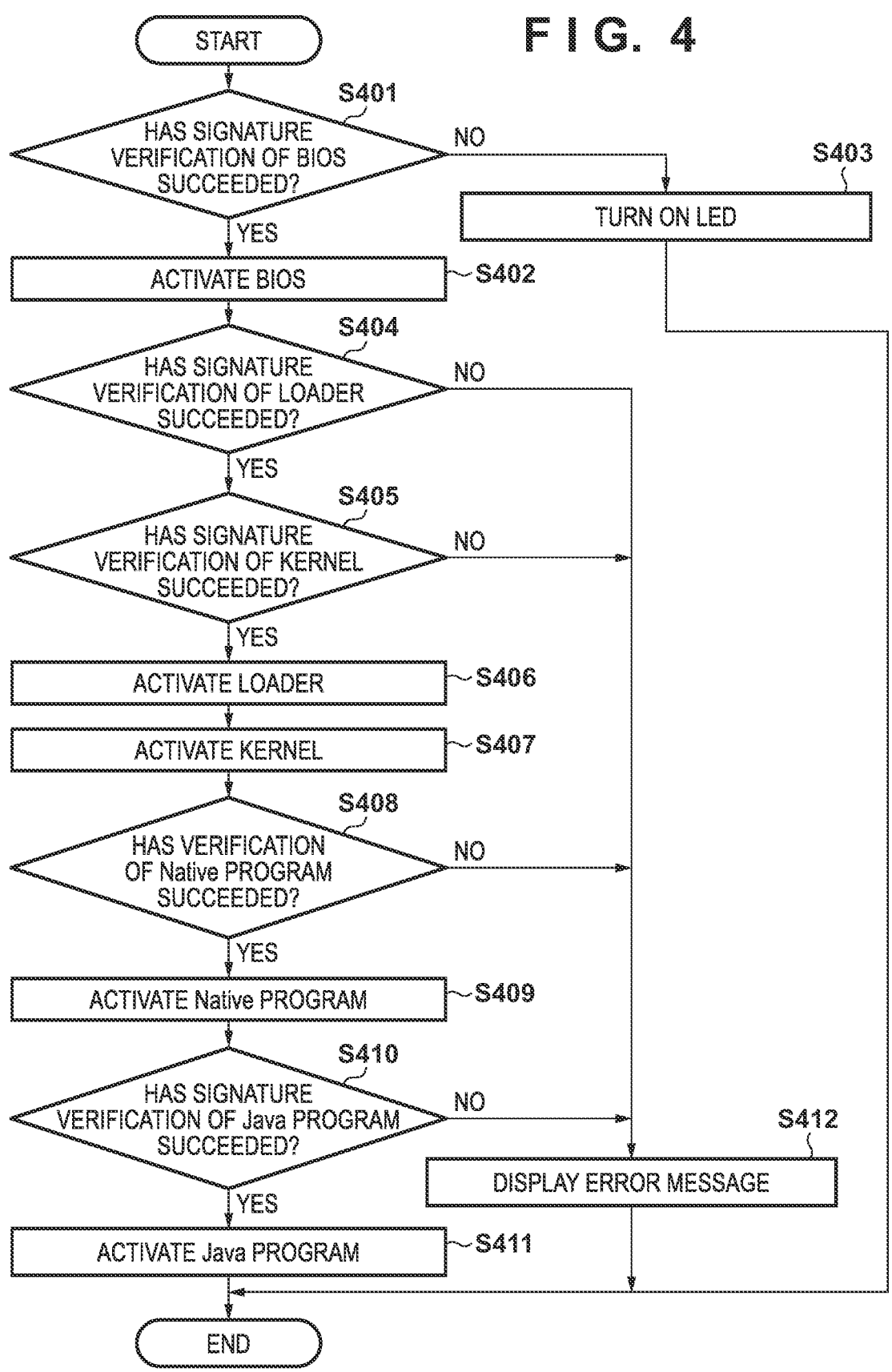

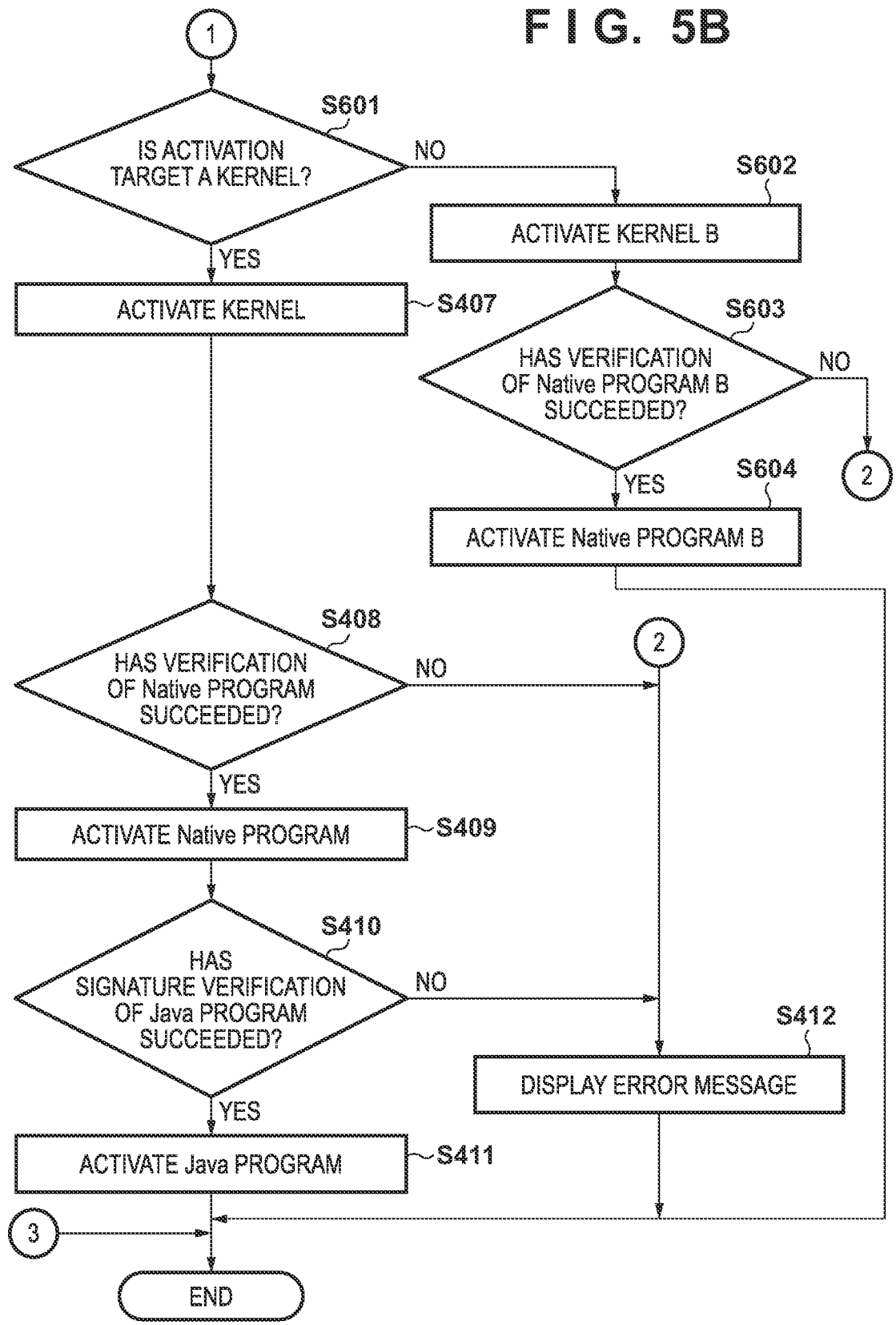

INFORMATION PROCESSING APPARATUS, AND INFORMATION PROCESSING METHOD

BACKGROUND OF THE INVENTION

Field of the Invention

The present invention relates to an information processing apparatus, and an information processing method.

Description of the Related Art

Computer attacks that exploit vulnerabilities of software in a computer system to alter the software and use the computer with malicious intent have become an issue. As a countermeasure against such attacks, a method is considered in which a program is given a signature and stored and the signature of the program is verified every time the program is activated to detect the presence or absence of alteration. US-2014-0089651 proposes a method that modularizes programs to allow partial replacement of the programs and stores signature verification processing and key information that is necessary for the verification by embedding the processing and the key information within respective modules.

However, the above-described conventional technique has the following problem. For example, in the above-described conventional technique, when the same algorithm or the same key information is used for signatures of the respective modules, the same signature verification processing or the same key information is redundantly stored in the modules. Therefore, utilization efficiency of memory resources and the like is low, and, in a device that is reduced in size or cost, precious memory resources are currently not being effectively used.

SUMMARY OF THE INVENTION

The present invention enables realization of a mechanism that detects alteration of a system at the time of activation while effectively using memory resources.

One aspect of the present invention provides an information processing apparatus that successively activates a plurality of modules, comprising: a first module; a second module; and a third module, wherein the first module activates the second module which has been verified, and the second module activates the third module which has been verified, wherein the first module includes verification information used for verifying both of the second module and the third module, verifies the second module using the verification information and verifies the third module using the verification information.

Another aspect of the present invention provides an information processing method comprising: activating a first module; verifying, by the first module, a second module; activating, by the first module, the second module which has been verified by the first module; verifying, by the first module, a third module; activating, by the first module, the third module which has been verified by the first module, wherein the verifying of the second module and the verification of the third module are performed by the first module using the same verification information included in the first module.

Further features of the present invention will be apparent from the following description of exemplary embodiments with reference to the attached drawings.

BRIEF DESCRIPTION OF THE DRAWINGS

FIGS. 2A and 2B are diagrams each illustrating a software configuration of a multifunction peripheral according to an embodiment.

FIG. 4 is a flowchart illustrating a processing procedure according to an embodiment.

FIGS. 5A and 5B are a flowchart illustrating a processing procedure according to an embodiment.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Note that a multifunction peripheral (digital multifunction peripheral/MFP) is described as an example of an information processing apparatus according to an embodiment. However, the present invention is applicable not only to a multifunction peripheral, but also to any information processing apparatus.

First Embodiment

The following describes a first embodiment of the present invention with reference to the accompanying drawings. Note that the following embodiment does not limit the present invention, which is defined by the claims, and all combinations of features described in the embodiment are not necessarily essential for solving problems to be solved with the present invention. A multifunction peripheral (digital multifunction peripheral/MFP) is described as an example of an information processing apparatus according to the embodiment. However, the present invention is applicable not only to a multifunction peripheral, but also to any information processing apparatus.

Hardware Configuration of Information Processing Apparatus

Figure 1:
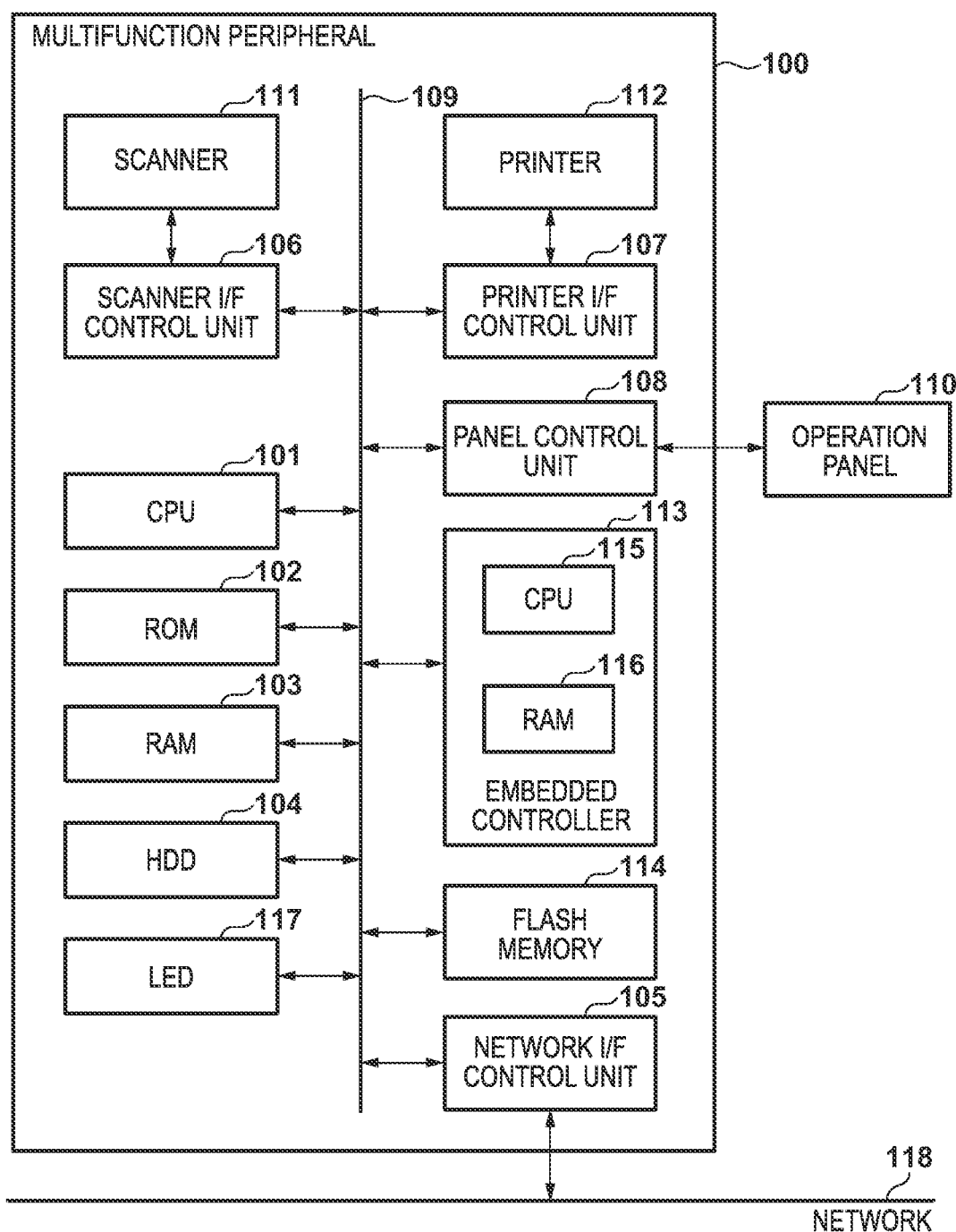
FIG. 1 is a diagram illustrating a hardware configuration of a multifunction peripheral according to an embodiment.

First, hardware configurations of a multifunction peripheral 100, which is an information processing apparatus according to the present embodiment, and an embedded controller 113 will be described with reference to FIG. 1. The multifunction peripheral 100 includes a CPU 101, a read-only memory (ROM) 102, a random access memory (RAM) 103, a hard disk drive (HDD) 104, a network I/F control unit 105, a scanner I/F control unit 106, a printer I/F control unit 107, a panel control unit 108, a scanner 111, a printer 112, the embedded controller 113, a flash memory 114, and an LED 117. The embedded controller 113 includes a CPU 115 and a RAM 116.

The CPU 101 integrally controls the entirety of the apparatus by executing software programs of the multifunction peripheral 100. The ROM 102 is a read-only memory and stores a basic input/output system (BIOS) of the multifunction peripheral 100, fixed parameters, and the like. The RAM 103 is a random access memory and is used for, for example, storing programs and temporary data when the CPU 101 controls the multifunction peripheral 100. The HDD 104 is a hard disk drive and stores some applications and various data. The flash memory 114 stores various modules such as a loader, a kernel, and applications.

The CPU 115 of the embedded controller 113 controls a part of the multifunction peripheral 100 by executing software programs of the embedded controller 113. The RAM 116 is a random access memory and is used for, for example, storing programs and temporary data when the CPU 115 controls the multifunction peripheral 100. The multifunction peripheral 100 includes a main controller that integrally controls the system, in contrast with the embedded controller 113. The main controller includes at least the CPU 101, the ROM 102, and the RAM 103.

The network I/F control unit 105 controls data transmission to and data reception from a network 118. The scanner I/F control unit 106 controls document reading performed by the scanner 111. The printer I/F control unit 107 controls print processing or the like performed by the printer 112. The panel control unit 108 controls a touch-panel type operation panel 110 to control display of various pieces of information and input of instructions made by a user. A bus 109 connects the CPU 101, the ROM 102, the RAM 103, the HDD 104, the network I/F control unit 105, the scanner I/F control unit 106, and the printer I/F control unit 107 to one another. The bus 109 also connects the panel control unit 108, the embedded controller 113, and the flash memory 114 to one another. Control signals from the CPU 101 and data signals from respective devices are transmitted through the bus 109. The LED 117 is turned on as necessary to report an abnormality in software or hardware to the outside.

Software Configuration of Information Processing Apparatus

Next, software modules that are included in the multifunction peripheral 100 according to the present embodiment will be described with reference to FIG. 2A. The multifunction peripheral 100 includes a boot program (boot program module) 209 within the embedded controller 113, as a software module. Further, the multifunction peripheral 100 includes a BIOS 210, a loader 211, a kernel 212, a Native program 213, a Java (registered trademark) program 214, a UI control unit 203, and a communication managing unit 207.

The communication managing unit 207 transmits data to and receives data from the outside via the network 118 by controlling the network I/F control unit 105 connected to the network 118. The UI control unit 203 receives, through the panel control unit 108, input made on the operation panel 110 and performs processing in accordance with the input, or outputs a screen to the operation panel 110.

The boot program 209 is a program that is executed by the CPU 115 of the embedded controller 113 when the power supply of the multifunction peripheral 100 is turned on, executes processing related to activation, and includes a BIOS alteration detecting unit 201 that detects alteration of the BIOS. The BIOS 210 is a program that is executed by the CPU 101 after the boot program 209 is executed, executes processing related to activation, and includes a loader/kernel alteration detecting unit 202 that detects alteration of the loader 211 and the kernel 212.

The loader 211 is a program that is executed by the CPU 101 after processing of the BIOS 210 is completed, and executes processing related to activation. The kernel 212 is a program that is executed by the CPU 101 after processing of the loader 211 is completed, executes processing related to activation, and includes a program alteration detecting unit 205 that detects alteration of the Native program 213.

The Native program 213 includes a plurality of programs that are executed by the CPU 101 and that provide functions in cooperation with the Java program 214 of the multifunction peripheral 100. For example, the Native program 213 includes programs for controlling the scanner I/F control unit 106 and the printer I/F control unit 107 and an activation program. The activation program is called from among the programs of the Native program by the kernel 212 and executes activation processing. The Native program 213 also includes, as one of the programs, a Java program alteration detecting unit 206 that detects alteration of the Java program.

The Java program 214 is a program that is executed by the CPU 101 and provides functions in cooperation with the Native program 213 of the multifunction peripheral 100. Examples of the program include a program for displaying a screen on the operation panel 110.

Activation Procedure

Figure 3A:
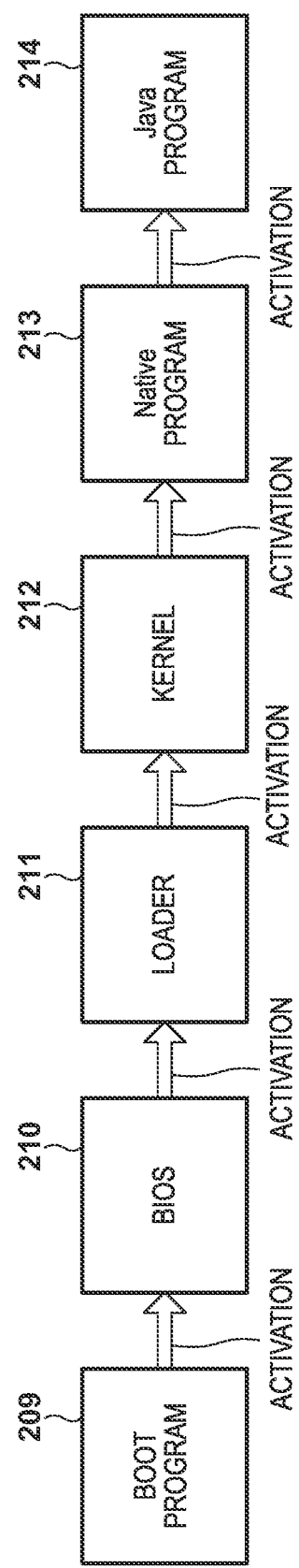
FIGS. 3A to 3D are schematic diagrams each illustrating operations performed at the time of activation according to an embodiment.
Figure 3B:
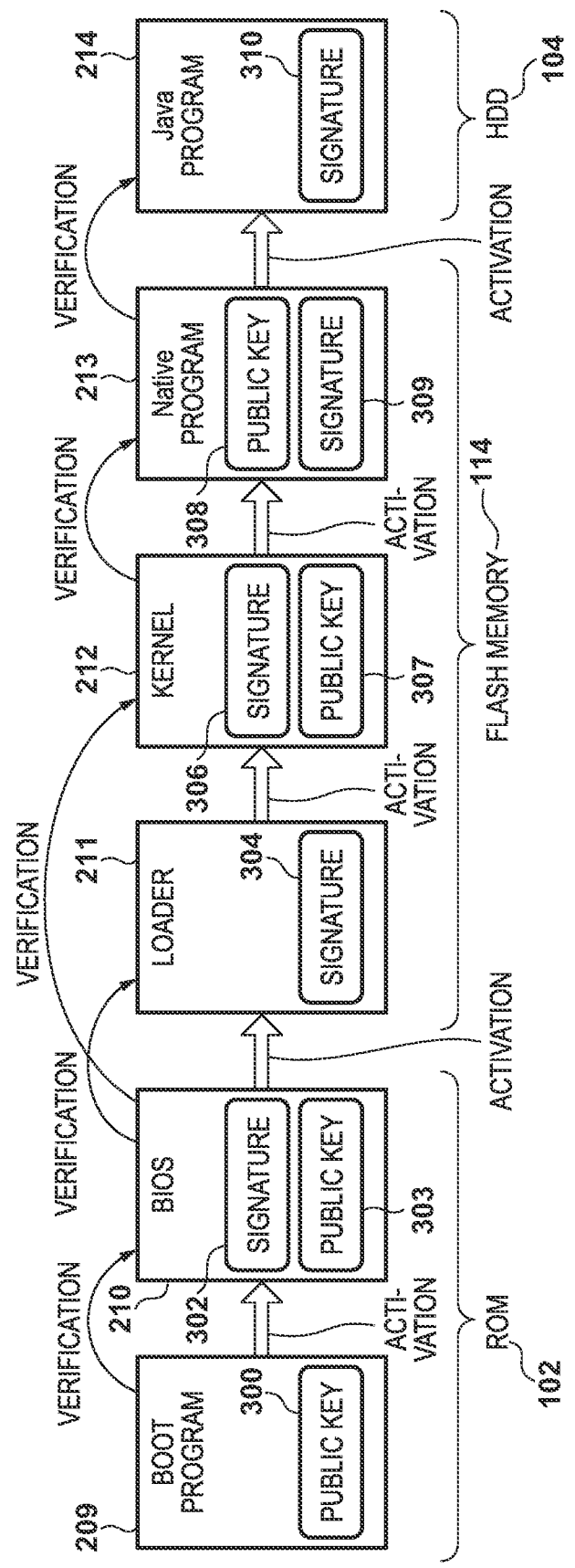

The following describes an activation procedure of the multifunction peripheral 100 with reference to FIGS. 3A and 3B. FIG. 3A illustrates an order in which the multifunction peripheral 100 is activated without alteration detection being performed. The boot program 209 activates the BIOS 210, the BIOS 210 activates the loader 211, the loader 211 activates the kernel 212, and the kernel 212 activates the activation program from among the programs of the Native program 213. In the activation program, the Java program 214 is activated, and thereafter the Native program 213 and the Java program 214 provide functions of the multifunction peripheral 100 in cooperation. As described above, activation of the modules is controlled to activate the modules in a predetermined order, and upon completion of activation of a preceding module, activation processing of the next module is executed.

FIG. 3B illustrates an order in which the multifunction peripheral 100 is activated while alteration detection is being performed. As illustrated, the boot program 209, the BIOS 210, the loader 211, the kernel 212, the Native program 213, and the Java program 214 are activated in this order while alteration detection is being performed. Alteration of a module that is to be activated is detected by the module that was activated immediately before the module to be activated. For example, alteration of the BIOS 210 is detected by the boot program 209. FIG. 3B also illustrates locations where the programs, digital signatures (hereinafter referred to as signatures), and public keys (verification information) for verifying the signatures are stored. As illustrated in FIG. 3B, the modules respectively store their own signatures. On the other hand, predetermined modules (for example, a first module) store the public keys, but some modules do not store the public keys. This is because, in the present embodiment, the same public key for a plurality of modules is stored in a predetermined module, and alteration of the plurality of modules is successively detected by the predetermined module. As a result, memory resources can be used effectively.

In the following description, it is assumed that the boot program 209 and the BIOS 210 are stored in the ROM 102, and the loader 211, the kernel 212, and the Native program (first program) 213 are stored in the flash memory 114. Also, it is assumed that the Java program (second program) 214 is stored in the HDD 104.

A public key 300 for BIOS signature verification is stored in the boot program 209, and a BIOS signature 302 and a public key 303 for loader/kernel verification are stored in the BIOS 210. A loader signature 304 is stored in the loader 211. A kernel signature 306 and a public key 307 for Native program verification are stored in the kernel 212, and a Native program signature 309 and a public key 308 for Java program verification are stored in the Native program 213.

A Java program signature 310 is stored in the Java program 214. These public keys and signatures are preferably assigned to the respective programs before the multifunction peripheral 100 is shipped from the factory. In the multifunction peripheral 100 according to the present embodiment, alteration is detected by each of the detecting units 201, 202, 205, and 206, which verifies a program (module) to be activated next and, if there is no problem, activates the next program.

Processing Procedure

The following describes a processing procedure that is performed when activating the multifunction peripheral 100 according to the present embodiment with reference to FIG. 4. When the power supply of the multifunction peripheral 100 is turned on, the boot program 209 is read from the ROM 102 to the RAM 116 and executed by the CPU 115.

In step S401, the BIOS alteration detecting unit 201 included in the boot program 209 verifies the BIOS signature and determines whether or not verification was successful. Specifically, the BIOS alteration detecting unit 201 reads the BIOS 210, the public key 303 for loader/kernel verification, and the BIOS signature 302 from the ROM 102 to the RAM 116. Further, the BIOS alteration detecting unit 201 verifies the BIOS signature 302 by using the public key 300 for BIOS verification and determines whether or not verification was successful. If verification of the signature failed, the routine proceeds to step S403 in which the BIOS alteration detecting unit 201 turns on the LED 117 and ends processing. In contrast, if verification of the signature was successful, the BIOS alteration detecting unit 201 provides electric power to the CPU 101 and ends processing of the boot program. The routine depicted by the flowchart then proceeds to processing in step S402 and the following steps that are to be executed by the CPU 101.

When electric power is provided to the CPU 101, the CPU 101 reads the BIOS 210 and the public key 303 for loader/kernel verification from the ROM 102 to the RAM 103 and activates the BIOS 210 in step S402. All subsequent processing described below is executed by the CPU 101.

When the BIOS 210 is activated, the routine proceeds to step S404. In step S404, the BIOS 210 executes various kinds of initialization processing, and the loader/kernel alteration detecting unit 202 included in the BIOS 210 reads the loader 211 and the loader signature 304 from the flash memory 114 to the RAM 103. Further, the loader/kernel alteration detecting unit 202 verifies the loader signature 304 by using the public key 303 for loader/kernel verification and determines whether or not verification was successful. If verification of the signature failed, the routine proceeds to step S412 in which the loader/kernel alteration detecting unit 202 causes the operation panel 110 to display an error message, and ends processing by stopping activation. In contrast, if verification of the signature was successful, the loader/kernel alteration detecting unit 202 reads the kernel 212, the public key 307 for Native program verification, and the kernel signature 306 from the flash memory 114 to the RAM 103, and the routine then proceeds to step S405.

In step S405, the loader/kernel alteration detecting unit 202 verifies the kernel signature 306 by using the public key 303 for loader/kernel verification and determines whether or not verification was successful. If verification of the signature failed, the routine proceeds to step S412 in which the loader/kernel alteration detecting unit 202 causes the operation panel 110 to display an error message, and ends processing by stopping activation. In contrast, if verification of the signature was successful, the loader/kernel alteration detecting unit 202 ends processing and the routine then proceeds to step S406.

In step S406, the BIOS 210 activates the loader 211 read to the RAM 103. When the loader 211 is activated, the loader 211 executes various kinds of initialization processing and reads the kernel 212, the public key 307 for Native program verification, and the kernel signature 306 from the flash memory 114 to the RAM 103. The routine proceeds to step S407 in which the loader 211 activates the kernel 212 read to the RAM 103.

When the kernel 212 is activated, the routine proceeds to step S408. In step S408, the kernel 212 executes various kinds of initialization processing. Further, the program alteration detecting unit 205 included in the kernel 212 reads the Native program 213, the public key 308 for Java program verification, and the Native program signature 309 from the flash memory 114 to the RAM 103. In step S408, the program alteration detecting unit 205 verifies the Native program signature 309 by using the public key 307 for Native program verification and determines whether or not verification was successful. If verification of the signature failed, in step S412, the program alteration detecting unit 205 causes the operation panel 110 to display an error message, and ends processing by stopping activation. In contrast, if verification of the signature was successful, the program alteration detecting unit 205 ends processing and the Native program 213 is activated in step S409.

When the Java program alteration detecting unit 206 that executes alteration detecting processing is activated from among the programs of the Native program 213, the routine proceeds to step S410. In step S410, the Java program alteration detecting unit 206 reads the Java program 214 and the Java program signature 310 from the HDD 104 to the RAM 103. In step S410, the Java program alteration detecting unit 206 verifies the Java program signature 310 by using the public key 308 for Java program verification and determines whether or not verification was successful. If verification of the signature failed, the routine proceeds to step S412 in which the Java program alteration detecting unit 206 causes the operation panel 110 to display an error message, and ends processing by stopping activation. If verification of the signature was successful, the Java program alteration detecting unit 206 ends processing and the Native program 213 activates the Java program 214 in step S411.

As described above, the information processing apparatus according to the present embodiment successively activates a plurality of modules subsequently to activation of the boot program. Each of the modules stores its own signature in a memory or the like in advance and activates a module to be activated next when verification of the signature of the module to be activated next is successful. Also, a first module among the plurality of modules detects alteration of a second module that is to be activated next by using verification information stored in a memory or the like in advance that is to be used for verification of the signature of the second module. Further, the first module detects alteration of at least one third module that is to be activated after the second module by using the above verification information. Also, when the second module is activated by the first module, the second module activates the third module to be activated next. As described above, according to the present embodiment, information regarding the signature is stored in each module in advance, but the verification information need not be stored in each module in advance. That is, a predetermined module (first module) stores the verification information and detects alteration of some of the plurality of modules by using the verification information. Therefore, the verification information need not be stored in all of the plurality of modules, and therefore memory resources can be used effectively. Furthermore, according to the present embodiment, it is possible to provide a more robust mechanism for detecting alteration of the system.

Second Embodiment

Figure 3C:
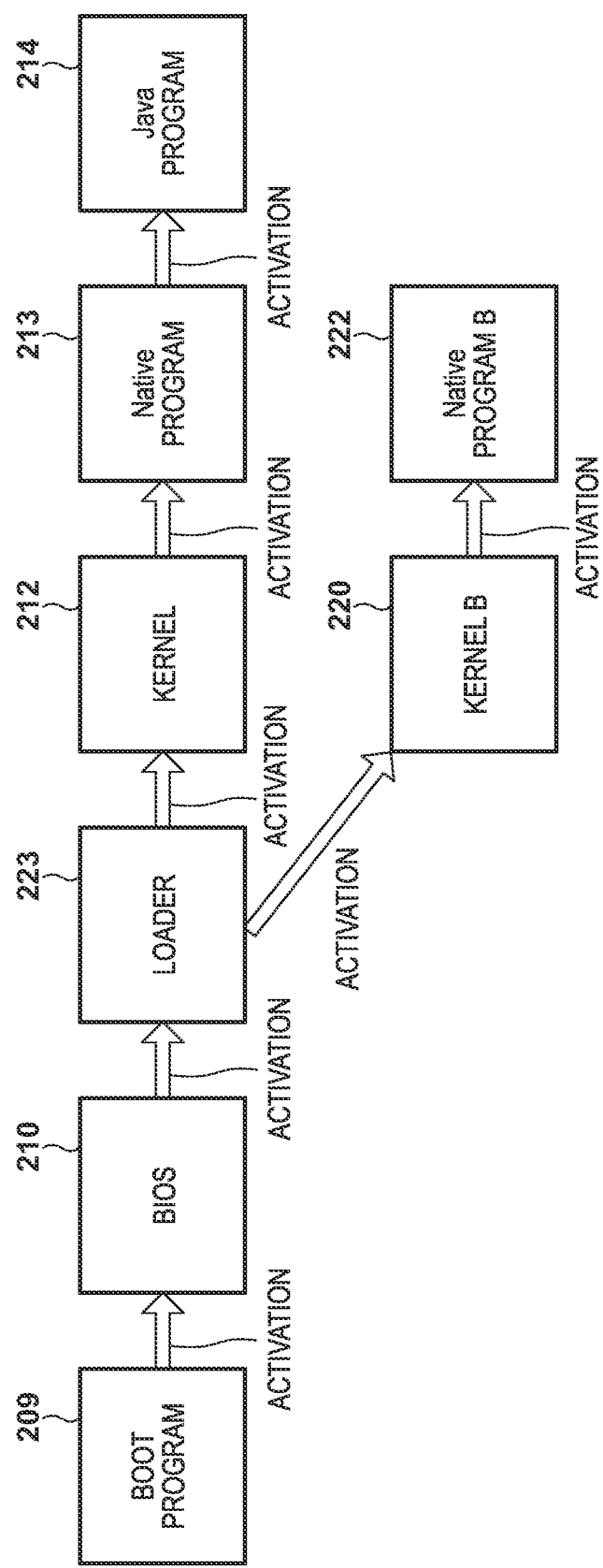

The following describes a second embodiment of the present invention. As illustrated in FIG. 3C, in some cases, a plurality of kernels and a plurality of programs are held by the multifunction peripheral 100 and a kernel and a program to be activated are switched by the loader. In such a case, according to the configuration of the above-described first embodiment, there is a problem in that when a kernel B 220 other than the kernel 212 is to be activated, the kernel B 220 cannot be activated since there is no signature for the kernel B 220 and alteration is detected despite no alteration being actually made. Therefore, in the present embodiment, a method will be described for performing activation while alteration detection is performed in a configuration in which different kernels and different programs are held.

Software Configuration

Figure 2B:
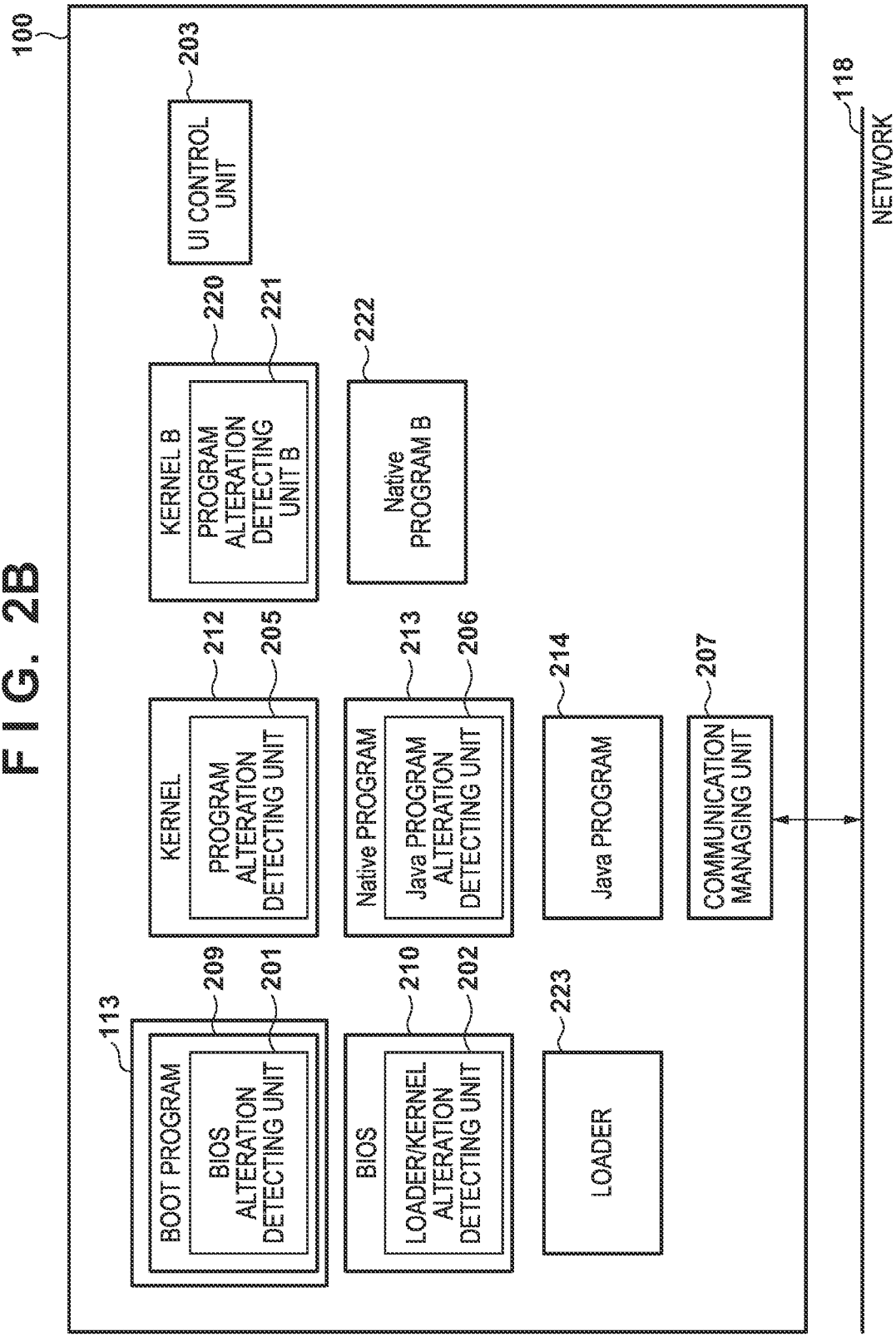

First, an exemplary configuration of software modules that are included in the multifunction peripheral 100 according to the present embodiment will be described with reference to FIG. 2B. Since components 201 to 214 are equivalent to those illustrated in FIG. 2A, a description thereof is omitted.

A loader 223 is a program that is executed by the CPU 101 after processing of the BIOS 210 is completed, executes processing related to activation, and switches a kernel to be activated according to user input made on the operation panel 110.

The kernel B 220 is a program that is executed by the CPU 101 and that is different from the kernel 212, executes processing related to activation, and includes a program alteration detecting unit B 221 that detects alteration of a Native program B 222. The Native program B 222 is a program that is executed by the CPU 101 and provides a function of updating the multifunction peripheral 100. The Native program B 222 is called by the kernel B 220 and provides a function of updating the kernel 212, the Native program 213, and the Java program 214. Note that the Native program B 222 is not limited to the program that provides the update function, and may be a program that provides another function.

Activation Procedure

Figure 3D:
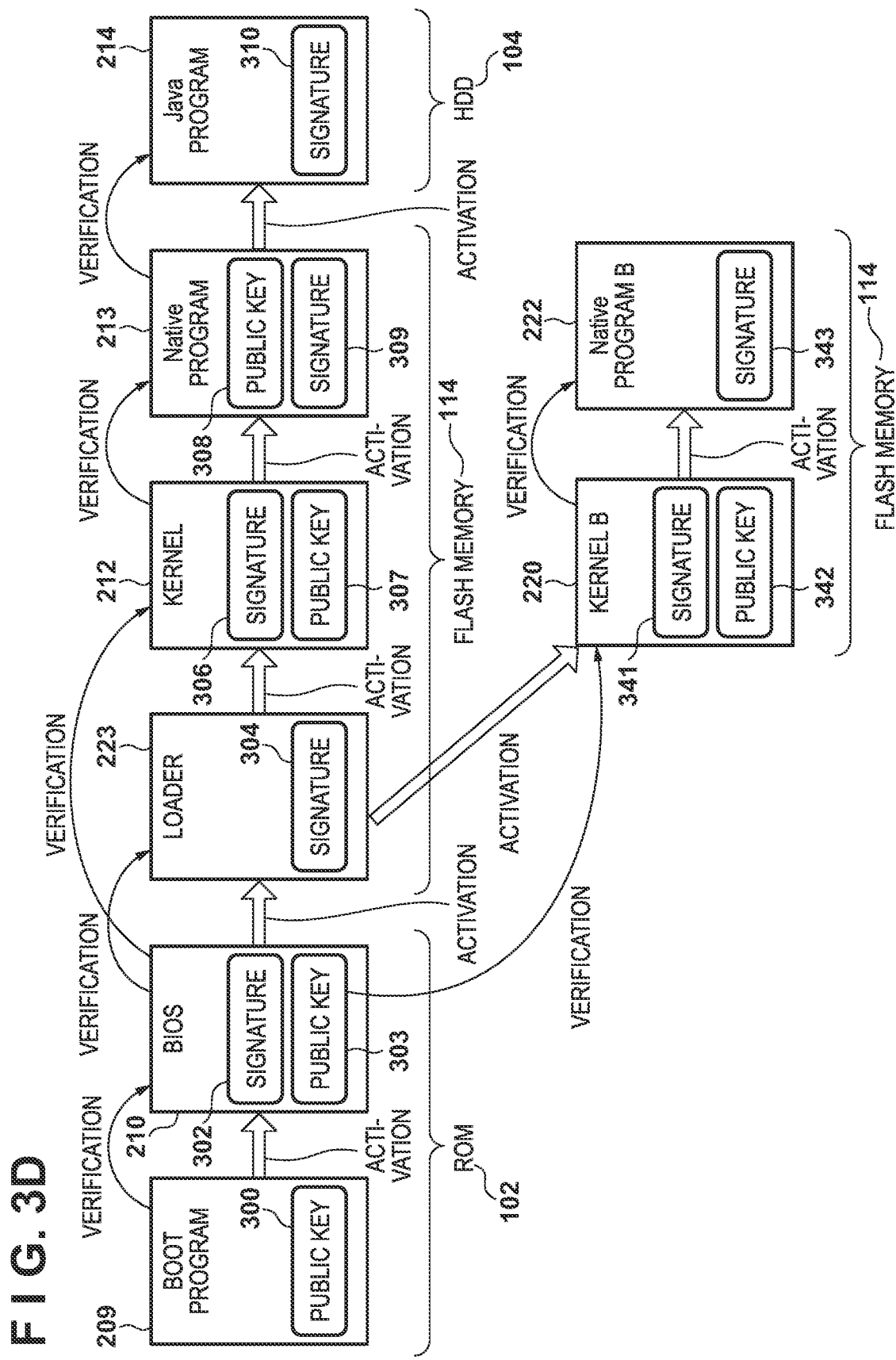

The following describes, with reference to FIG. 3D, the flow of activation processing in which the object of alteration detection is switched depending on which of the kernel 212 and the kernel B 220 is to be activated by the loader 223.

It is assumed that the loader 223 includes a signature 304 of the loader 223. The kernel B 220 includes a kernel B signature 341 and a public key 342 for Native program B verification, and the Native program B 222 includes a Native program B signature 343. The public key and signatures are preferably assigned to the respective programs before the multifunction peripheral 100 is shipped from the factory. As described above, the BIOS 210 includes the public key (verification information) for each of a plurality of kernels that can be activated next.

Processing Procedure

Figure 5A:
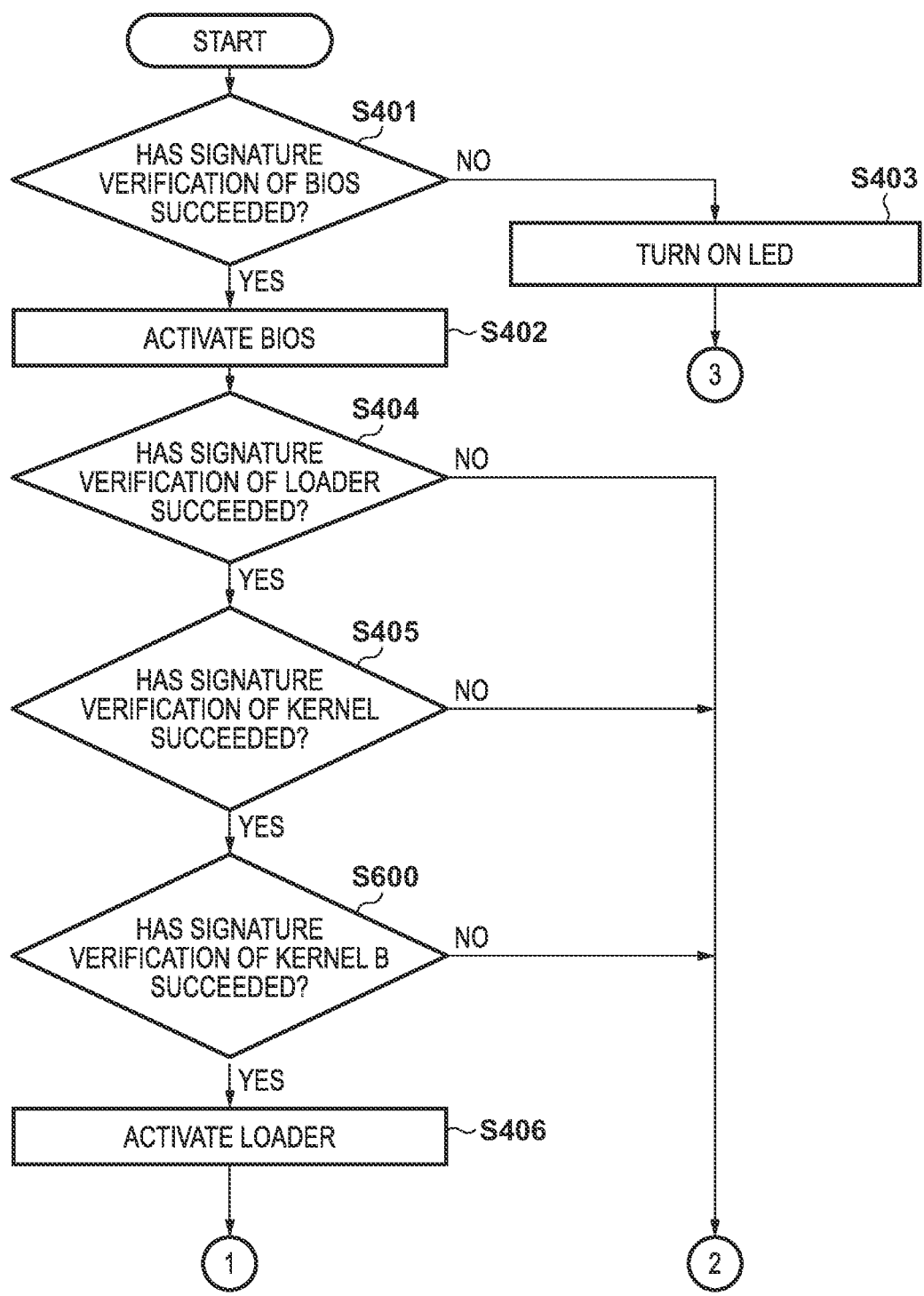

The following describes a processing procedure that is performed when activating the multifunction peripheral 100 according to the present embodiment with reference to FIGS. 5A and 5B. When the power supply of the multifunction peripheral 100 is turned on, the boot program 209 is read from the ROM 102 to the RAM 116 and executed by the CPU 115. Since processing in steps S401 to S405 is equivalent to that illustrated in FIG. 4, a description thereof is omitted.

In step S600 following step S405, the loader/kernel alteration detecting unit 202 verifies the kernel B signature 341 by using the public key 303 for loader/kernel verification and determines whether or not verification was successful. If verification of the signature failed, the routine proceeds to step S412. If verification of the signature was successful, the loader/kernel alteration detecting unit 202 ends processing, and in step S406, the BIOS 210 activates the loader 223 read to the RAM 103.

When the loader 223 is activated in step S406, the loader 223 executes various kinds of initialization processing. Subsequently, in step S601, the loader 223 determines whether or not the kernel 212 is selected as the object of activation based on user input made on the operation panel 110. If the kernel 212 is selected as the object of activation, the routine proceeds to processing in step S407. Since subsequent processing in steps S407 to S412 is equivalent to that illustrated in FIG. 4, a description thereof is omitted. In contrast, if the kernel B 220 is selected, the routine proceeds to step S602 in which the loader 223 activates the kernel B 220 read to the RAM 103.

When the kernel B 220 is activated, the kernel B 220 executes various initialization processing, and the program alteration detecting unit B 221 included in the kernel B 220 reads the Native program B 222 and the Native program B signature 343 from the flash memory 114 to the RAM 103. Subsequently, in step S603, the program alteration detecting unit B 221 verifies the Native program B signature 343 by using the public key 342 for Native program B verification and determines whether or not verification was successful. If verification of the signature failed, the routine proceeds to processing in step S412. In contrast, if verification of the signature was successful, the program alteration detecting unit B 221 ends processing, and the kernel B 220 activates the Native program B 222 in step S604. When the Native program B 222 is activated, the Native program B 222 provides the update function to the user.

As described above, according to the present embodiment, even in a configuration in which a plurality of kernels and a plurality of programs are held, it is possible to detect alteration of the kernels and programs and activate the kernels and programs, and effects equivalent to those achieved in the first embodiment can be achieved.

Variation Examples

The present invention is not limited to the above-described embodiments, and various variations can be made. Although the public keys in the above-described first and second embodiments include different public keys, some of the public keys may be the same as each other. Although the ROM 102, the flash memory 114, and the HDD 104 are described as locations where the programs are stored, the locations are not limited and may include another storage medium. Also, the programs may not be stored in respective locations described above, and, for example, the loader 223 may be stored on the ROM 102.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-060737 filed on Mar. 27, 2018, which is hereby incorporated by reference herein in its entirety.

What is claimed is:

1. An information processing apparatus, comprising:
a memory that stores programs; and
one or more processors that sequentially execute a first program and a second program, and execute a third program executed for performing a function of the information processing apparatus or a fourth program executed for updating the information processing apparatus, at an activation sequence,
wherein the one or more processors are further configured to
execute the first program to verify whether or not the second program, the third program, and the fourth program are altered,
execute the second program, which is verified not to have been altered, to perform a function other than to verify whether or not the third program and the fourth program have been altered, and
determine whether to activate the third program or the fourth program that have been verified not to have been altered when executing the first program, and execute the third program or the fourth program in accordance with the determination;
wherein the first program is a BIOS (Basic Input/Output System), the second program is a loader, the third program is a first kernel, and the fourth program is a second kernel.

2. The information processing apparatus according to claim 1,
wherein the second program includes a signature of the second program, the third program includes a signature of the third program, and the fourth program includes a signature of the fourth program, and
wherein the one or more processors are further configured to execute the first program to verify the second program using the signature included in the second program and verification information included in the first program, and to verify the third program using the signature included in the third program and the verification information included in the first program or to verify the fourth program using the signature included in the fourth program and the verification information included in the first program.

3. The information processing apparatus according to claim 1,
wherein the one or more processors are further configured to execute the first program to detect alteration of the second program based on the verification of the second program using verification information included in the first program, to detect alteration of the third program based on the verification of the third program using the verification information included in the first program, and to detect alteration of the fourth program based on the verification of the fourth program using the verification information included in the first program.

4. The information processing apparatus according to claim 3,
further comprising a sub processor that executes a boot program, wherein the boot program includes:
verification information to be used for verification of a signature of the first program;
wherein the sub processor is configured to:
detect alteration of the first program by using the verification information to be used for verification of the signature of the first program; and
activate the first program in a case where verification of the signature of the first program is successful.

5. The information processing apparatus according to claim 1, further comprising an operation unit that accepts an operation of a user,
wherein the one or more processors are further configured to execute the third program to verify a fifth program using a signature of the fifth program to be activated following the third program, and
the fifth program is a program for controlling at least the operation unit of the information processing apparatus.

6. The information processing apparatus according to claim 1, wherein the one or more processors are further configured to not activate the third program if the first program has detected alteration of the third program based on the verification of the third program using the verification information included in the first program.

7. The information processing apparatus according to claim 1,
wherein the BIOS is stored in a read-only memory (ROM), and the loader and the kernel are stored in a flash memory.

8. The information processing apparatus according to claim 1,
wherein the one or more processors are further configured to execute the second program to switch whether a first kernel or a second kernel is executed by the second program and according to user input.

9. An information processing method for sequentially activating a first program, a second program, a third program, and a fourth program at an activation sequence, the method comprising:

executing a first program and a second program, and executing a third program executed for performing a function of the information processing apparatus or a fourth program executed for updating the information processing apparatus;

executing the first program to verify whether or not the second program, the third program, and the fourth program are altered;

executing the second program, which is verified not to have been altered, to perform a function other than to verify whether or not the third program and the fourth program have been altered, and determining whether to activate the third program or the fourth program that have been verified not to have been altered when executing the first program, and executing the third program or fourth program in accordance with the determination;

wherein the first program is a BIOS (Basic Input/Output System), the second program is a loader, the third program is a first kernel, and the fourth program is a second kernel.

10. The information processing apparatus according to claim 1,
wherein the one or more processors are further configured to execute the third program to verify whether or not a fifth program has been altered in a case where the third program is verified not to have been altered when the first program is executed, and execute the fifth program which is verified not to have been altered, and execute the fourth program to verify whether or not a sixth program has been altered in a case where the fourth program is verified not to have been altered when the first program is executed, and execute the sixth program which is verified not to have been altered, and wherein the fifth program is a program for at least controlling the operation unit of the information processing apparatus, and wherein the sixth program is a program for at least updating the information processing apparatus.

11. The information processing apparatus according to claim 1, wherein the one or more processors are further configured to not activate the third program if the first program has detected alteration of the fourth program based on the verification of the fourth program using verification information included in the first program.

* * * * *